3,749,582
CHILLPROOFING FERMENTED MALT
BEVERAGES
Irwin M. Stone, Staten Island, N.Y., assignor to Baxter
Laboratories, Inc., Morton Grove, Ill.
No Drawing. Filed May 3, 1971, Ser. No. 139,946
Int. Cl. C12h 1/02
U.S. Cl. 99—48                                    4 Claims

ABSTRACT OF THE DISCLOSURE

A method of chillproofing fermented malt beverages, to improve storage stability and to prevent the development of hazes and turbidities in the finished packaged beer, comprises the combined use of tannic acid and the growth products of certain mold microorganisms containing decomplexing enzymes for the protein-tannin complex system.

---

This invention relates to the brewing of fermented malt beverages such as beers and ales and more particularly to the step in the brewing process known as chillproofing.

The chillproofing of fermented malt beverages (hereinafter referred to as "beer") is a necessary step in the brewing process. The beer-drinking consumer expects to receive a beverage that is sparklingly brilliant in clarity and one that will retain this clarity on long storage at low temperatures. The slightest haze appearing in the cold beer could be a cause for consumer complaint and rejection. The step in the brewing process that insures this crystal clarity under varied storage conditions and counteracts the deleterious effects of time and temperature is known as "chillproofing."

A procedure now most widely used in the industry for accomplishing the chillproofing of beer was first described in 1911 in a series of United States patents issued to Leo Wallerstein. That procedure involved the addition of a trace of proteolytic enzyme to the cold beer contained in tanks. On further cold storage and filtration a chillproofed beverage resulted. The proteolytic enzyme most generally used for chillproofing is papain, which is obtained from the fruit of *Carica papaya*, although ficin, bromelain or other plant proteases can also be employed. The chillproofing action comprises an enzymatic breakdown of the traces of high molecular weight proteins in the beer into smaller fragments which are more soluble and less precipitatable.

Another enzymatic chillproofing process, but of a nonproteolytic nature, was recently described in U.S. Pat. 3,366,483. Said process utilizes a mixture of chillproofing enzymes obtained as the extract or the concentrate of the extract of the water soluble growth products of certain mold microorganisms such as *Aspergillus niger* and other mold microorganisms as described in the patent. A product containing a mixture of chillproofing enzymes can be prepared, as taught in that patent, by extracting the mold growth with water and concentrating this extract such as by evaporation. This extract can be used after inactivating the limit dextrinase or, preferably, a dry product is used after precipitating said extract with a salt such as ammonium sulfate, dissolving the precipitate in water, adjusting the pH of the redissolved precipitate to strongly acid levels to inactivate limit dextrinase activity and evaporating the solution to dryness after readjustment to its original pH value. Said mixture of chillproofing enzymes, which can be dry or liquid, will be referred to hereinafter as the "enzyme complex preparation."

The specific mode of the chillproofing action of the mixture of enzymes contained in the enzyme complex preparation is not completely known. It is known, however, that the chillproofing activity is not entirely proteolytic, as the proteolytic activity in the enzyme complex preparation is not sufficient for this purpose, being much less than that of commercial proteolytic enzymatic chillproofing preparations. A large part of its action is due to its strong decomplexing action on the protein-tannin complex in the beer. The appearance of a chill haze in beer is generally regarded as due to the formation of highly insoluble protein-tannin combinations. The enzymes contained in the aforesaid enzyme complex preparation prevent the formation of these protein-tannin complexes and tend to decomplex any protein-tannin combinations formed before the enzyme complex preparation is added.

In the chillproofing of American type beers prepared with about 70% malt and 30% adjuncts such as corn or rice, about 15 parts per million (p.p.m.) to 25 p.p.m. of the enzyme complex preparation are required to produce a satisfactorily chillproofed beverage containing only the tannin bodies derived from the malt and hops. It has now been found, however, that if these beers are given a preliminary treatment with tannic acid, a synergism exists between said tannic acid treatment and the enzyme complex preparation such that there is an approximately 10 fold reduction in the amount of the enzyme complex preparation required to eliminate haze development and produce a highly stable beer. With a pretreatment of from about 25 to 80 p.p.m. tannic acid, only from about 1 to 3 p.p.m. of the enzyme complex preparation is required instead of the usual 15 to 25 p.p.m.

It is known that tannic acid or tannins have been proposed for the chillproofing of beer for a long time. However, the tannic acid chillproofing of beer has not found wide acceptance by the industry because its use is beset with many practical difficulties. Thus, as far back as 1909, British Pat. 30,181 disclosed the use of hop tannin for this purpose. In 1917, in U.S. Pat. 1,234,255, the combined use of tannic acid and a sulfite salt for the chillproofing of beer is described. In 1930 the use of a proteolytic enzyme was disclosed along with tannic acid and a sulfite salt in U.S. Pat. 1,764,955. Two patents were granted to the same inventor, one in 1930 on the use of tannin with a siliceous clay (U.S. Pat. 1,766,428), and another in 1932 on the same ingredients plus a proteolytic enzyme (U.S. Pat. 1,892,457). And finally in 1953, the composition of the above 1917 patent was modified by the addition of Irish Moss to the tannic acid-sulfite salt mixture (U.S. Pat. 2,658,829).

Notwithstanding this long and wide disclosure in the patent art covering a period of over 60 years, tannic acid did not obtain widespread or consistent commercial usage in the Brewery industry comparable with the success of the proteolytic enzymatic procedure over this period of time. The main reason for the lack of commercial success of this intrinsically efficient procedure of chillproofing is that none of the patented art ever solved the problem of eliminating the need for the very exact control of the amount of tannin to be added to any particular batch of beer. Thus, a significant drawback of tannic acid chillproofing is the necessity for adding the precise stoichiometric amount of tannic acid to exactly precipitate the protein-type compounds in the beer. If too much or too little tannic acid is added, very poor chillproofing results are obtained and the resulting beers are unstable and become hazy on storage. Because of batch to batch variations in beers it has been a practical necessity to titrate each tank of beer before tannin addition to determine the precise stoichiometric amount of tannic acid required for that particular tank. This required a high degree of technical skill and tedious, exact control that made tannin chillproofing a cumbersome unwieldly and uneconomical technique, subject to a high degree of error and haze development that could only be discerned after the beer was out in the trade and beyond recall.

When tannic acid levels slightly below the stoichiometric amount are used, the precipitation in the brewery tanks prior to filtration is incomplete and further precipitation slowly occurs in the package out in the trade, producing hazes and turbidities. When the exact stoichiometric amount of tannic acid is employed, there is essentially no change in the normal tannic levels of the beer as derived from the malt and hops as all the added tannins are precipitated and removed by filtration. When amounts in excess of the stoichiometric amount are used, the tannin levels of the beer are increased. This excess tannic acid in the beer is a constant hazard as it reacts with the nitrogen complexes formed on aging of the beer to produce hazes and turbidities.

The use of the aforesaid enzyme complex preparation in combination with a tannic acid pretreatment of the beer eliminates the need for this exact control of the levels of tannic acid additions required by the prior art. Levels of tannic acid below or above the stoichiometric amount can be used without experiencing the development of hazes and turbidities in the finished packaged beer out in the trade. In beers which are incompletely precipitated due to use of too small an amount of tannic acid, or in beers containing excess tannic acid due to overtreatment, hazes no longer are formed when the beer also contains additions of the aforesaid enzyme complex preparation. The presence of the protein-tannin decomplexing enzyme in the enzyme complex preparation prevents the formation of these hazes whether too little or too much tannic acid is originally used to treat the beer. Thus, the 60 year old problem of adding the exact stoichiometric amount of tannic acid is overcome by the present invention. A simplified, commercially feasible, chill-proofing procedure, not requiring the tedious, exact control procedures of the prior art, therefore results from the combined use of tannic acid with said enzyme complex preparation.

The following examples are illustrative of the present invention although the invention is not to be construed as limited thereto. Many variations of these examples can be made by those skilled in the art without departing from the scope of the appended claims and it is intended that all such variations are included in the claimed invention.

In Examples 1 to 5, below, the enzyme complex preparation is obtained as follows:

A wheat bran mash is prepared from wheat bran, wheat flour and water, and is sterilized. One hundred twenty-five grams of the sterile mash, contained in a Fernbach flask, is inoculated with an actively growing culture of *Aspergillus niger*. After suitable growth for about five days at 30° C., the resultant bran-growth product is dried at low temperature until ready for extraction. Ten parts by weight of water is then mixed with the bran and stirred or shaken continually for a period of an hour. The liquor is expressed from the wet bran by pressing (centrifugation or filtration can also be used). The liquor thus obtained is then concentrated by low temperature vacuum evaporation to a specific gravity of approximately 12° Baumé. The chillproofing materials are precipitated from this concentrated liquor by adding and dissolving therein ammonium sulfate to give salt concentration of about 25 percent to 33 percent by weight. This mixture is permitted to stand to allow the precipitate to form and settle. Some filter aid is added and the precipitate is centrifuged (filtration can also be used) to obtain a relatively dry cake. The cake is then redissolved in about 1.5 parts by weight of water at about 25° C. and the pH is adjusted from its original value of 4.5 to 5.0 to a value of 1.8 with hydrochloric acid. The pH is held at this value for about one hour at this temperature and is then readjusted back to its original pH value with sodium hydroxide solution. This liquor is then refiltered and the clear filtrate is dried by low-temperature vacuum drying (spray drying or freeze drying can also be used) to give a friable powder which is retained as the enzyme complex preparation.

EXAMPLE 1

End Fermented Beer is decanted from the settled yeast and transferred into 3 Ruh Storage Tanks. 32 p.p.m. of tannic acid is added to the beer of each of two tanks during the transfer. To the beer in the third tank is added 20 p.p.m. of a commercial proteolytic enzyme (papain) chillproofing preparation during the transfer. The beer is held at approximately $-2°$ C. overnight and 2 p.p.m. of the above-defined enzyme complex preparation is added to one tank of the tannic acid treated beer and thoroughly mixed. Three chillproofing treatments have thus been prepared in this example: (1) tannic acid alone, (2) tannic acid plus the enzyme complex preparation and (3) commercial proteolytic enzyme (papain) treatment.

These 3 beers are then processed similarly by being stored cold for about 10 days and then filtered. After filtration the beer is placed in cold storage tanks, carbonated if necessary, and then given the final filtration. Then the beer is bottled off and pasteurized. Some finished bottles from these 3 batches are subjected to storage stability tests by keeping the bottles at 30° C. and each week the bottles are placed for 18-20 hours in a 0° C. bath. After this cold treatment the amount of haze developed is measured with a Radiometer Haze meter. The bottles are then returned to storage at 30° C. for another week and the cycle repeated. Table I shows the chill haze developed after various storage periods. The haze measurements are reported in Formazin Turbidity Units (FTU). This is a standard method of the American Society of Brewing Chemists and is described in their "Methods of Analysis," Beer-24. The higher the FTU figure the more the haze. A reading in FTU of about 75 to 100 is a noticeable but allowable haze while about 150 and higher is an objectional haze.

TABLE I.—STORAGE STABILITY TESTS

| Chillproofing treatment | Chill haze measurements after storage (FTU) [1] | | | | | |
|---|---|---|---|---|---|---|
| | Initial | 4 wks. | 8 wks. | 12 wks. | 16 wks. | 24 wks. |
| 32 p.p.m. tannic acid | 36 | 65 | 135 | 190 | 270 | 400 |
| 32 p.p.m. tannic acid plus 2 p.p.m. enzyme complex preparation | 28 | 50 | 45 | 40 | 45 | 60 |
| 20 p.p.m. of commercial double strength proteolytic enzyme preparation | 64 | 80 | 130 | 160 | 235 | 345 |

[1] Each result is the average of measurements on 3 bottles.

EXAMPLE 2

A series of experimental brews was set up in a series of tanks similar to that described in Example 1. Two tanks were treated with 28 p.p.m. of tannic acid, two other tanks were treated with 42 p.p.m. of tannic acid, and another two tanks were treated with 56 p.p.m. of tannic acid. Two tanks remained untreated with the tannic acid. To one of each of the two tanks was added 3 p.p.m. of the above-defined enzyme complex preparation. The beers were then uniformly processed by a procedure similar to that of Example 1. Samples of the finished pasteurized bottled beer from each tank were withdrawn for tannin analysis and storage stability tests. The tannin was determined by the method of Irwin Stone and Philip P. Gray, Proceedings, American Society of Brewing Chemists, 1948, pages 76–94. The results of the Tannin Assay are given in Table II.

TABLE II.—TANNIC ACID CONTENT OF FINISHED BEER

| Tannic acid treatment amount added (p.p.m.): | Tannic acid finished beer (p.p.m.) |
|---|---|
| None | 25 |
| 28 | 27 |
| 42 | 38 |
| 56 | 25 |

It is seen that the addition of tannic acid in the range employed produces essentially no increase in the tannin content of the finished beer. The results of the chill haze measurements made during the course of the storage stability test are contained in Table III.

TABLE III.—STORAGE STABILITY TESTS

| Tannic acid treatment, p.p.m. | Enzyme complex preparation treatment, p.p.m. | Chill haze measurements after storage (FTU) [1] | | | | | |
|---|---|---|---|---|---|---|---|
| | | Initial | 4 wks. | 8 wks. | 20 wks. | 30 wks. | 44 wks. |
| None | None | 55 | 290 | 550 | 850 | | |
| 28 | None | 45 | 80 | 170 | 190 | 255 | 400 |
| 42 | None | 45 | 85 | 145 | 275 | 320 | 435 |
| 56 | None | 50 | 70 | 120 | 240 | 275 | 345 |
| None | 3 | 50 | 210 | 260 | 220 | 130 | 190 |
| 28 | 3 | 43 | 60 | 62 | 50 | 68 | 110 |
| 42 | 3 | 45 | 55 | 50 | 45 | 57 | 80 |
| 56 | 3 | 43 | 43 | 43 | 45 | 60 | 85 |

[1] Each result is the average of measurements on 3 bottles.

These data reveal that the chillproofness obtained with the combination of the tannic acid treatment with the enzyme complex preparation is unattainable by the use of either tannic acid or the enzyme complex preparation separately and alone.

EXAMPLE 3

The wort from a 60% malt, 40% corn grits mash is placed in a kettle and heated to boiling. About 15 minutes after the start of boiling, one-half of the total hops used is added to the boiling wort. About 5 minutes later, 30 p.p.m. of tannic acid is added to the boiling wort. About 15 minutes later the second portion of the hops is added and the boiling continued for about another hour. The wort is placed in a settling tank and when the precipitated trub has settled, the wort is decanted through the cooler and placed in the fermenting vessel. The wort is then fermented and the beer processed in the customary manner. In the storage tank, 3 p.p.m. of the above-defined enzyme complex preparation are added. The finished pasteurized beer so produced is found to be well chillproofed and highly resistant to the development of chill haze.

EXAMPLE 4

A series of tanks of cold Ruh beer was treated according to the procedure of Example 2 with various chillproofing materials in order to obtain the treatments listed in Table IV below. Sample bottles of the finished pasteurized beers obtained from these different treatments were subjected to storage stability tests. The record of the development of chill haze in these samples is contained in Table IV.

The FTU figures on the first row of Table IV (Tank 1) are those of a non-chillproofed beer. It is seen that said beer is unacceptable in the trade in less than a month's time after leaving the brewery. The proteolytic enzyme treatment on this beer (Tank 2) extends the acceptability to between 2 to 4 months. The treatment with 80 p.p.m. of tannic acid alone (Tank 4) provides a beer stable under these conditions for between 1 and 2 months. The combined use of 80 p.p.m. of tannic acid with 2 p.p.m. of the enzyme complex preparation (Tank 5) produces an extremely stable beer which develops no increase in chill haze during the entire 21 weeks duration of the storage stability test, an achievement unequalled by any other chillproofing treatment in this series.

EXAMPLE 5

Finished bottles of tannic acid pretreated beer are obtained. To each of the bottles was added the enzyme complex preparation in the amounts noted in Table V. These bottles were stored at 30° C. for the times indicated. At the indicated times the bottles were removed from 30° C. storage and placed in a 0° C. bath for 20 hours. The developed chill haze was then measured and recorded in Table V.

TABLE V

| Enzyme complex preparation added in p.p.m. after tannic acid pretreatment | Chill haze measurements after storage at 30° C. (FTU) | | | | |
|---|---|---|---|---|---|
| | Initial | 1 wk. | 4 wks. | 8 wks. | 12 wks. |
| None | 65 | 115 | 210 | 370 | 660 |
| 0.25 | 50 | 99 | 121 | 128 | 186 |
| 0.50 | 46 | 99 | 99 | 121 | 142 |
| 1.00 | 50 | 92 | 78 | 107 | 60 |
| 2.00 | 57 | 99 | 82 | 50 | 34 |
| 4.00 | 57 | 85 | 46 | 50 | 37 |

As can be seen from the foregoing examples, use of the combination of tannic acid and the enzyme complex preparation in the chillproofing procedure is quite flexible. Many variations can be introduced both in the quantities used and in the processing procedure. The tannic acid treatment levels can vary from about 15 to about 150 p.p.m. Generally, from about 25 to 80 p.p.m. is sufficient and is the preferred range; higher levels are also satisfactory but they are usually unnecessary and uneconomical. The enzyme complex preparation can vary from about 0.5 part per million to about 15 p.p.m. Again, the higher levels of this range are not usually required and are uneconomical. The preferred range is from about 1 to 3 p.p.m.

Different batches of the enzyme complex preparation are usually fairly uniform but can vary somewhat in their chillproofing effect. The activity can be assayed and standardized by means of its clearing effect on a gelatine-tannin haze formed under standardized conditions. The selection of a good active batch of the enzyme complex preparation, of known activity from practical brewery tests, provides an enzyme of standard activity against which other batches may be compared.

The tannic acid can be added to the wort before or during boiling or to the fermenting beer or the end fermented beer. The preferred point of adding the enzyme complex preparation is to the beer after the tannic acid has been added and stored cold for a sufficient time to allow the precipitated haze to coagulate into larger micelles. The enzyme complex preparation can also be added

TABLE IV.—STORAGE STABILITY TESTS

| Tank number | Tannic acid treatment, p.p.m. | Chillproofing enzyme treatment | Chill haze measurements after storage (FTU) | | | | |
|---|---|---|---|---|---|---|---|
| | | | Initial | 4 wks. | 8 wks. | 16 wks. | 21 wks. |
| 1 | None | None | 52 | 365 | 610 | 780 | |
| 2 | None | Proteolytic 20 p.p.m. | 57 | 85 | 121 | 190 | 230 |
| 3 | None | Enzyme complex preparation, 2 p.p.m. | 57 | 265 | 275 | 185 | 175 |
| 4 | 80 | None | 65 | 120 | 190 | 240 | 240 |
| 5 | 80 | Enzyme complex preparation, 2 p.p.m. | 71 | 57 | 50 | 50 | 60 | before the tannin addition or immediately after the addition and mixing of the tannic acid in the beer. It is undesirable to add the enzyme complex preparation to the beer in the same solution as the tannic acid.

Although the microorganism *Aspergillus niger* was specifically used in the foregoing examples, it will be appreciated that related microorganisms of the *Aspergillus niger* group, for example, *A. awamori, A. foetidus, A. phoenicus, A. usami* and other fungal microorganisms as described in U.S. Pat. 3,366,483, can be employed in this invention.

Various modifications and adaptations of the foregoing examples can be derived by the person skilled in the art after reading the foregoing specification and the claims appended hereto. All such modifications and adaptations are included within the scope of the invention.

I claim:

1. In the process of chillproofing beer, the improvement which comprises the combination of (A) admixing tannic acid with the beer in an amount of from about 15 to about 150 p.p.m. on a weight basis and separating the resulting precipitate therefrom, and (B) admixing with the beer the enzyme complex preparation obtained as the extract of the water-soluble growth product of a mold microorganism selected from the group consisting of *Aspergillus niger, A. awamori, A. foetidus, A. phoenicus* and *A. usami* and being free of limit dextranase activity in an amount of from about 1 to about 3 p.p.m. on a weight basis, said admixing steps (A) and (B) being conducted in any order during the beer production process.

2. The process of claim 1 in which the tannic acid is added to the wort followed by the steps of boiling the wort, separating the precipitate therefrom, fermenting the wort and admixing the enzyme complex preparation therein.

3. The process of claim 1 in which the tannic acid is admixed with the beer followed by admixing the enzyme complex therein.

4. The process of claim 1 in which the enzyme complex preparation is admixed with the beer followed by admixing the tannic acid therein and storing the beer at cold storage temperatures before separation of the precipitate.

References Cited

UNITED STATES PATENTS

| | | | |
|---|---|---|---|
| 2,223,753 | 12/1940 | Wallerstein | 99—48 |
| 3,366,483 | 1/1968 | Stone | 99—48 |
| 1,764,955 | 6/1930 | Heuser | 99—48 |

OTHER REFERENCES

Clerck, J. De., Stabilization of Beer Through Tannin Addition, Institute of Brewing Journal, vol. 76, 1970 (p. 504).

Clerck, J. De., Stabilization of Beer by Addition of Tannin, Institute of Brewing Journal, vol. 75, 1969, (p. 215).

Clerck, J. De., A Textbook of Brewing, vol. I, Chapman & Hall Ltd., London, 1957 (pp. 304–309 and 324).

DAVID M. NAFF, Primary Examiner

UNITED STATES PATENT OFFICE
CERTIFICATE OF CORRECTION

Patent No. 3,749,582            Dated July 31, 1973

Inventor(s) Irwin M. Stone

It is certified that error appears in the above-identified patent and that said Letters Patent are hereby corrected as shown below:

In the claims, at col. 7, line 27, cancel "dextranase" and insert -- dextrinase --.

Signed and sealed this 23rd day of July 1974.

(SEAL)
Attest:

McCOY M. GIBSON, JR.            C. MARSHALL DANN
Attesting Officer                Commissioner of Patents